(12) United States Patent
Finlow-Bates et al.

(10) Patent No.: US 8,638,671 B2
(45) Date of Patent: Jan. 28, 2014

(54) SYSTEM AND METHOD FOR TESTING WIRELESS POSITION LOCATING

(75) Inventors: Keir Finlow-Bates, Kangasala (FI); Florean Curticapean, Tampere (FI)

(73) Assignee: QUALCOMM Incorporated, San Diego, CA (US)

( * ) Notice: Subject to any disclaimer, the term of this patent is extended or adjusted under 35 U.S.C. 154(b) by 242 days.

(21) Appl. No.: 13/189,435

(22) Filed: Jul. 22, 2011

(65) Prior Publication Data

US 2013/0021912 A1 Jan. 24, 2013

(51) Int. Cl.
*G01R 31/08* (2006.01)
*H04J 1/16* (2006.01)
*H04L 1/00* (2006.01)

(52) U.S. Cl.
USPC ......................................................... 370/241

(58) Field of Classification Search
USPC ......................................................... 370/241
See application file for complete search history.

(56) References Cited

U.S. PATENT DOCUMENTS

2010/0135178 A1* 6/2010 Aggarwal et al. ............. 370/252

OTHER PUBLICATIONS

Ciurana, M. et al.,"A Ranging System with IEEE 802.11 Data Frames", Radio and Wireless Symposium, 2007 IEEE, IEEE, Piscataway, NJ, USA, Jan. 1, 2007, pp. 133-136, XP031080050, DOI: 10.1109/RWS.2007.351785 ISBN: 978-1-4244-0444-5.
Hamalainen, A. et al., "A Ranging System for an IEEE 802.11 OFDM Transceiver", Radio and Wireless Symposium, 2009. RWS '09. IEEE, IEEE, Piscataway, NJ, USA, Jan. 18, 2009, pp. 683-686, XP031457500, ISBN: 978-1-4244-2698-0.
International Search Report and Written Opinion—PCT/US2012/047077—ISA/EPO—Nov. 19, 2012.
Spirent "Spirent GSS5700 W i-Fi Positioning Access Point Simulator", Jan. 26, 2011, pp. 1-4, XP55042745, Retrieved from the Internet: URL:http://www.spirent.com/-/media/Datasheets/Positioning/GSS5700.ashx (retrieved on Oct. 31, 2012).

* cited by examiner

*Primary Examiner* — Mark Rinehart
*Assistant Examiner* — Maharishi Khirodhar
(74) *Attorney, Agent, or Firm* — Mahamedi Paradice Kreisman LLP (57) ABSTRACT

The present application describes a system and method for testing the position locating and navigation technology of a wireless client. To simulate the locations of the wireless access points in the array that are visible to the wireless client from the simulated location, the round-trip time between the wireless client and a wireless access point can be modified by delaying a response signal from the wireless access point in response to a signal received from the wireless client. The wireless client, knowing the location of the wireless access point and the expected response time of the wireless access point, interprets the delay in the response of the wireless access point as proportional to the distance of the wireless access point from the simulated location of the wireless client.

19 Claims, 5 Drawing Sheets

SYSTEM AND METHOD FOR TESTING WIRELESS POSITION LOCATING

TECHNICAL FIELD

The present application relates generally to wireless network test equipment, and more particularly to systems and methods to emulate the location of wireless access points to test the Wi-Fi locating technology of a wireless electronic device.

BACKGROUND

Wi-Fi locating technology is commonly incorporated into a mobile wireless device to aid in the determination of the location, position and/or motion of the mobile wireless device. It is desirable that the Wi-Fi locating technology of the mobile wireless device be capable of determining the location of the mobile wireless device quickly, accurately and under a wide variety of conditions.

Wi-Fi Positioning Systems (WPS) are known in the art that maintain a large global public database of Wi-Fi access points and their precise locations throughout the world. The data from a WPS database may be used by a mobile wireless device having locating technology to identify its location. Conventional location determination techniques used in existing wireless networks may utilize round-trip time (RTT) measurements derived from signals transmitted between the mobile wireless device and the Wi-Fi access points to determine the location of the mobile wireless device.

It is desirable to be able to test the performance of the Wi-Fi locating technology of a mobile wireless device to predict the speed, accuracy and sensitivity of the locating and positioning technology of the device. Testing the performance of the mobile device in a WLAN environment prior to the mass production of the device will mitigate the risk that the device will not perform as expected in a real-world scenario. However, in order to properly test the device, numerous scenarios must be emulated in a test environment, absent ambient noise and sources of interference.

Field testing systems are known in the art for testing the Wi-Fi locating technology of a wireless device. However, field testing of the Wi-Fi locating technology requires physically positioning the access points and the wireless device at various locations. As such, field testing is costly and time-consuming and suffers from lack of reliability and repeatability.

Thus, there is a need for a system and method that provides repeatable and reliable emulation of real-world scenarios to test the performance of Wi-Fi locating technology implemented in a mobile wireless device.

SUMMARY

The present application describes a system and method for testing the position locating and navigation technology of a wireless client. Position locating testing of a wireless client can be performed utilizing the round-trip time between the wireless client and a wireless access point visible to the wireless client from a simulated location of the wireless client. To simulate the location of the wireless access point, the round-trip time between the wireless client and the wireless access point can be modified by delaying a response signal from the wireless access point in response to a signal received from the wireless client. The wireless client, knowing the location of the wireless access point and the expected response time of the wireless access point, interprets the delay in the response of the wireless access point as proportional to the distance of the wireless access point from the simulated location of the wireless client. Knowing the distance from the wireless access point and its position, the wireless client can estimate its location, thereby testing the position locating technology of the wireless client.

A method for testing the position locating technology of a wireless client includes, selecting a test scenario for a wireless client, the test scenario comprising a location of a wireless access point visible to the wireless client from the simulated location of the wireless client. An expected response creation time for the wireless access point visible to the wireless client is then identified. The wireless access point visible to the wireless client is then emulated and the distance between the simulated location of the wireless client and the location of the wireless access point is simulated using an adjusted response creation time for each of the wireless access points of the array of wireless access points. The test scenario is then executed using the expected response creation time and the adjusted response creation time for the wireless access point to test the position locating technology of the wireless device.

Calculating the adjusted response creation time for the wireless access point further includes, identifying a distance between the simulated location of the wireless client and the location of the wireless access point, calculating a simulated propagation delay for the wireless access point, the simulated propagation delay to equal the distance between the simulated location of the wireless client and the location of the wireless access point, divided by the speed of light and calculating the adjusted response creation time for the wireless access point as equal to the sum of the expected response creation time of the wireless access point and the simulated propagation delay for the wireless access point.

In a particular embodiment, testing the position locating technology of the wireless client includes transmitting a packet from the wireless client to at least one wireless access point, receiving the packet at the wireless access point, transmitting a response packet from the wireless access point to the wireless client using the adjusted response creation of the wireless access point by delaying the transmission of the response packet for a time equal to the adjusted response creation time, receiving the response packet at the wireless client, determining a round-trip time for the packet, calculating an estimated distance from the simulated location of the wireless client to the location of the wireless access point using the round-trip time for the packet and the expected response creation time for the wireless access point, wherein the estimated distance is equal to one half of the round-trip time minus the expected response creation time and calculating an estimate of the simulated location of the wireless client using the estimated distance from the simulated location of the wireless client to the location of the wireless access point and the location of the wireless access point to test the position locating technology of the wireless client.

A test system for testing the position locating technology of a wireless client is provided including, a high frequency clock, a test controller, at least one wireless access point to receive a control input from the test controller and a clock input from the high frequency clock, the at least one wireless access point to emulate a wireless access point visible to a wireless client at a simulated location and to simulate a distance between the simulated location of the wireless client and the location of the at least one wireless access point using an adjusted response creation time for the at least one wireless access point, and an access point database to provide an expected response creation time and the location of the at least one wireless access point to the wireless client.

A logic circuit for position locating technology testing is provided including, a wireless access point logic circuit having an expected response creation time and a delay circuit to adjust the expected response creation time of the wireless access point logic circuit to simulate a distance of the wireless access point logic circuit from a wireless client.

DETAILED DESCRIPTION

Those of ordinary skill in the art will realize that the following detailed description of embodiments in this specification is illustrative only, and is not intended to be in any way limiting. Other embodiments will readily suggest themselves to such skilled persons having the benefit of this disclosure. It will be apparent to one skilled in the art that these specific details may not be required to practice the embodiments. In other instances, well-known devices are shown in block diagram form to avoid obscuring the present application. In the following description of the embodiments, substantially the same parts are denoted by the same reference numerals.

Figure 1:
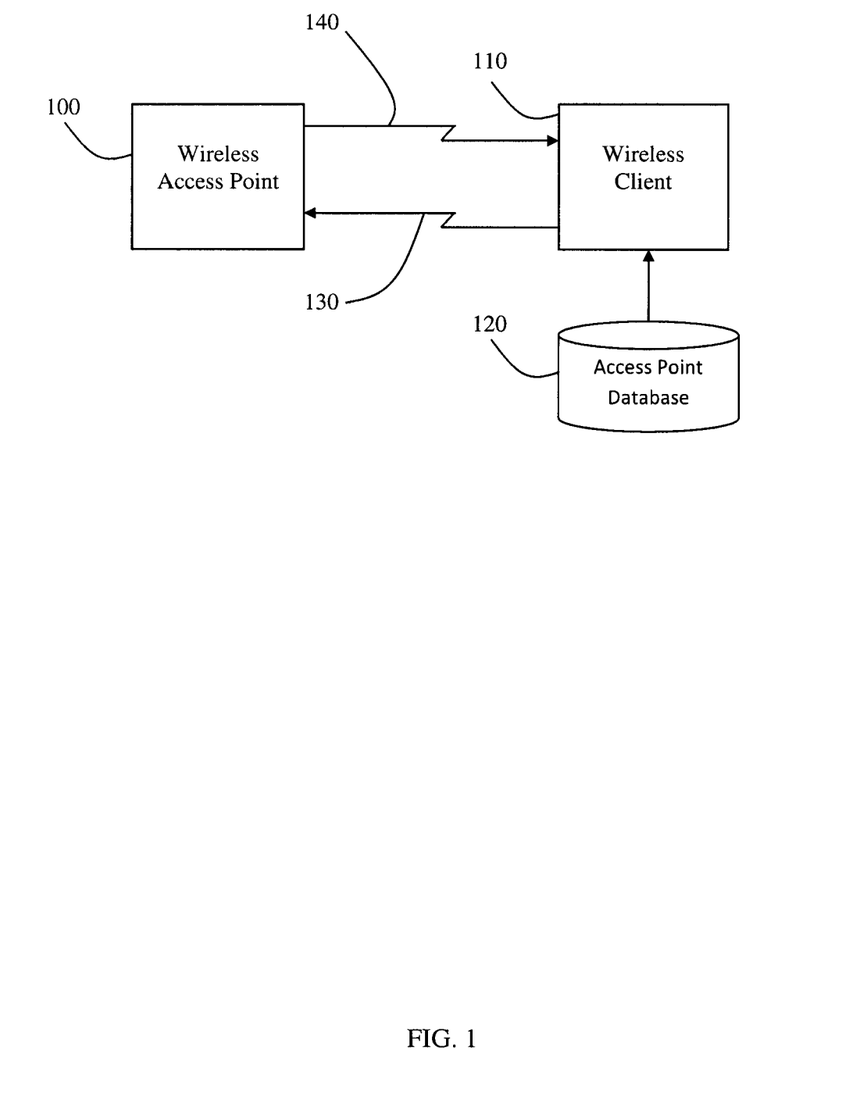
FIG. 1 is a diagram illustrating round-trip time distance calculation.

Wi-Fi location and navigation systems employed in a mobile wireless device allow tracking of the device to facilitate asset tracking as well as security and emergency services. Wi-Fi location and navigation systems based on round-trip time of a wireless signal within the Wi-Fi network are known in the art. The basic principle of a round-trip time based navigation system is illustrated with reference to FIG. 1. As shown in FIG. 1, the wireless client 110 operating within the Wi-Fi network transmits a wireless signal 130 to a wireless access point 100 within the Wi-Fi network and notes the time of departure of the signal from the wireless client 110. There is an associated propagation delay between the time the signal is transmitted by the wireless client 110 and the time it is received at the wireless access point 100. This propagation delay is proportional to the distance between the wireless client 110 and the wireless access point.

After the propagation delay, the wireless access point 100 receives the wireless signal. The wireless access point 100 then creates a response and transmits a response signal 140 to the wireless client 110. The creation of the response signal by the wireless access point 100 requires a predetermined period of time, herein referred to as the response creation time of the wireless access point 100. The response creation time of numerous access points and the associated physical location of the access points may be stored in a wireless access point database 120 that is accessible to the wireless client 110. The wireless client 110 may acquire the response creation time of the wireless access point 100 from the wireless access point database 120. Alternatively, the wireless client 110 may request the response creation time of the wireless access point 100 directly from the wireless access point 100. As such, the wireless client 110 is aware of the response creation time of the wireless access point 100.

After the propagation delay, the response signal 140 is received at the wireless client 110. The wireless client 110 notes the time of arrival of the response signal 140. The wireless client 110 determines the round-trip time of the signal as the difference between the time of arrival of the response signal 140 from the wireless access point 100 and the time of departure of the signal 130 from the wireless client 110.

It is known that wireless signals propagate at the speed of light, approximately 30 cm in 1 nanosecond. As a result, the distance between the wireless client 110 and the wireless access point 100 can be calculated as:

$$\text{distance} = \frac{\left(\text{Round Trip Time} - \text{Response Creation Time}\right)}{2} \times \text{speed of light}$$

Accordingly, subtracting the response creation time from the round-trip time and dividing the result by 2 will provide the propagation delay for the signal to travel from the wireless client 110 to the wireless access point 100. This propagation delay is proportional to the physical distance between the wireless client 110 and the wireless access point 100. As an example, if the round-trip time of the signal, minus the response creation time of a wireless access point 100 is 20 nanoseconds, then it can be determined that the wireless client 110 is a distance of 3 meters from the wireless access point 100. Using the calculated distance and the position of the access point retrieved from the database, the position of the wireless client 110 can be estimated. At least three wireless access points 100 visible to the wireless client 110 may be necessary for a 2-dimensional position estimation of the wireless client 110. Additionally, at least four wireless access points 100 visible to the wireless client 110 may be necessary for a 3-dimensional position estimation of the wireless client 110. Identifying a plurality of wireless access points 100 that are visible to the wireless client and calculating the distances between the wireless client 110 and the plurality of wireless access points 100 will improve the accuracy of the estimated position of the wireless client 110.

In testing the wireless position locating technology of the wireless client, it is desirable to be capable of emulating a variety of test scenarios of a wireless network that includes a wireless client and a variety of wireless access points. Identifying a desired physical location for the wireless client and then emulating the wireless access points that are visible to the wireless client from the physical location of the wireless client will allow the position locating technology of the wireless client to be tested under a variety of simulated conditions.

To test the position locating technology of a wireless client, the wireless client to be tested may be coupled to an emulator designed to emulate a plurality of wireless access points visible to the wireless client. The wireless client may be coupled to the emulator using a wired connection of a known length and as such, the distance between the wireless client and the emulated wireless access points is a constant value. When the wireless client is coupled to the emulator using a wired connection, all of the wireless access points emulated by the emulator are at the same physical distance from the wireless access point. Additionally, the wired connection may be substantially short, such that the physical distance between the wireless client and the emulated access points is substantially negligible. In such a test environment, the emulator needs to make the wireless access points appear to be at various distances from the wireless client, although in actuality they are physically connected by a relatively short radio frequency cable.

Figure 2:
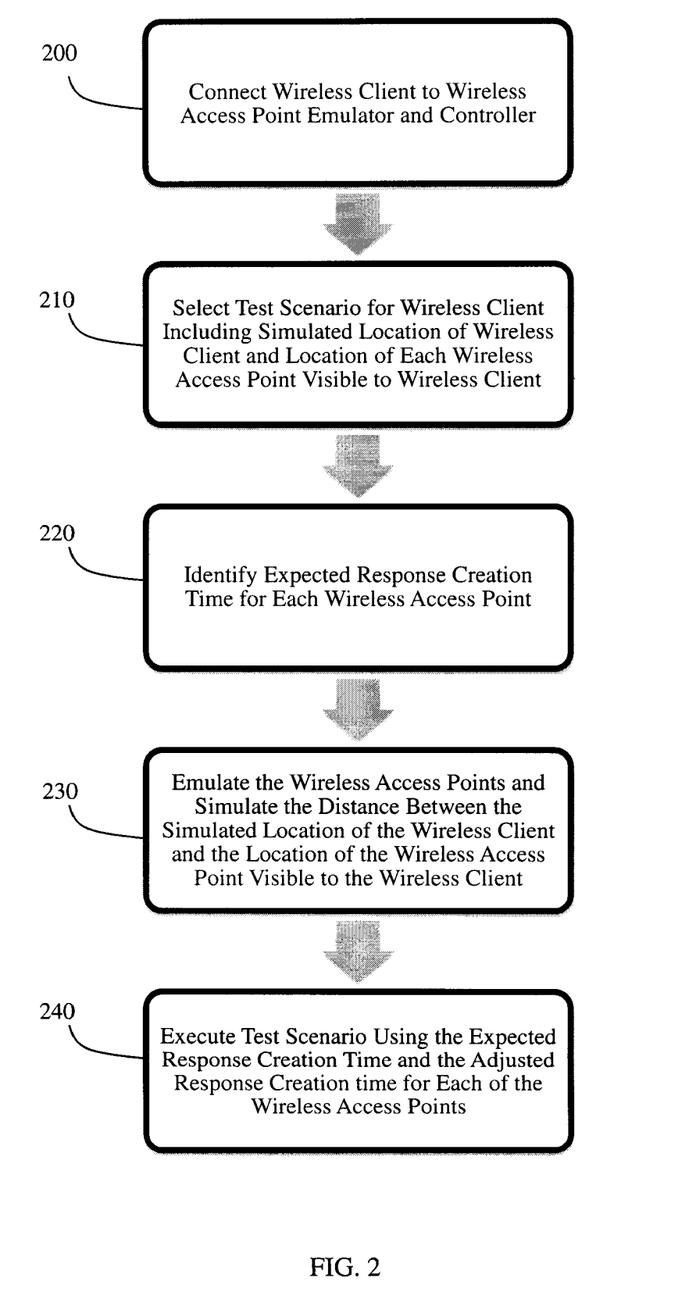
FIG. 2 is a flow diagram of a method for testing a position locating technology for a wireless client.

With reference to FIG. 2, in a wireless position locating test system, a wireless client may be coupled to a wireless access point emulator and a controller 200. The wireless access point emulator may emulate one or more wireless access points and the controller may control the operation of the wireless access point emulator. The wireless access point emulator may emulate a single access point at various locations relative to the wireless client. Alternatively, the wireless access point emulator may emulate an array of access points, each of the access points in the array of access point having a different location relative to the wireless client. The wireless client may be coupled to the wireless access point emulator by a substantially short, radio frequency cable. The controller may select a test scenario for the wireless client 210. The test scenario may include a desired simulated location for the wireless client and locations for the wireless access points that are visible to the wireless client from its simulated location. The coordinates of the wireless access points that are visible to the wireless client may be selected from a wireless access point database and may include the longitude, latitude and altitude of the wireless access point to be emulated. The wireless client may then identify an expected response creation time for each of the emulated wireless access points 220. The expected response creation times for the wireless access points may be identified from the wireless access point database or may alternatively be requested directly from the wireless access points. The expected response creation time represents the duration of time required for the wireless access point to create a response signal for subsequent transmission on the wireless network. An adjusted response creation time may then be calculated to adjust the expected response creation time to simulate the distance between the simulated location of the wireless client and the location of each wireless access point that is being emulated 230. The adjusted response creation time is equal to the expected response creation time of the access point and the simulated propagation delay experienced by a signal transmitted from the simulated location of the wireless client to the location of the wireless access point. Because the simulated propagation delay is proportional to the distance between the simulated location of the wireless client and the location of the wireless access point, the adjusted response creation time is said to include the distance between the simulated location of the wireless client and the location of the wireless access point. After the expected response creation time and the adjusted response creation time are known for each of the wireless access points, the test scenario can be executed for the wireless client using the expected response creation time and the adjusted response creation time for each of the wireless access points 240.

Figure 3:
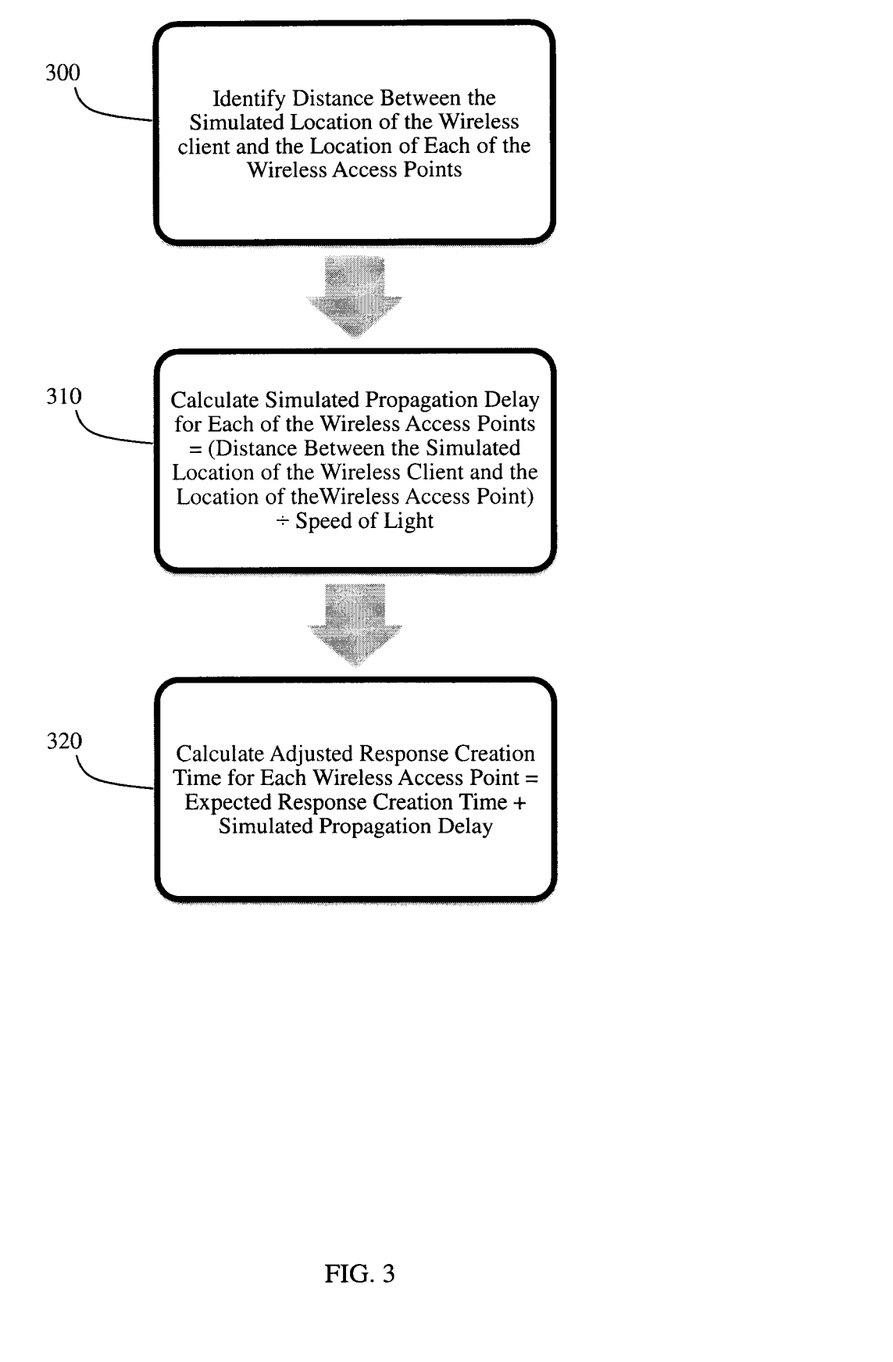
FIG. 3 is a flow diagram of a method for determining an adjusted response creation time for a wireless access point.

With reference to FIG. 3, in calculating the adjusted response creation time for each access point, the distance between the simulated location of the wireless client and the location of each of the wireless access points is identified 300. Knowing the coordinates of each location of the wireless access points from the wireless access point database allows for the identification of the distance between the simulated location of the wireless client and the location of each of the wireless access points. The simulated propagation delay between the simulated location of the wireless client and the location of each of the wireless access points can then be calculated as the identified distance between the simulated location of the wireless client and the location of each of the wireless access points divided by the speed of light 310. The adjusted response creation time for each of the wireless access point is then calculated as the expected response creation time for the wireless access point plus the simulated propagation delay for the wireless access point 320.

Figure 4:
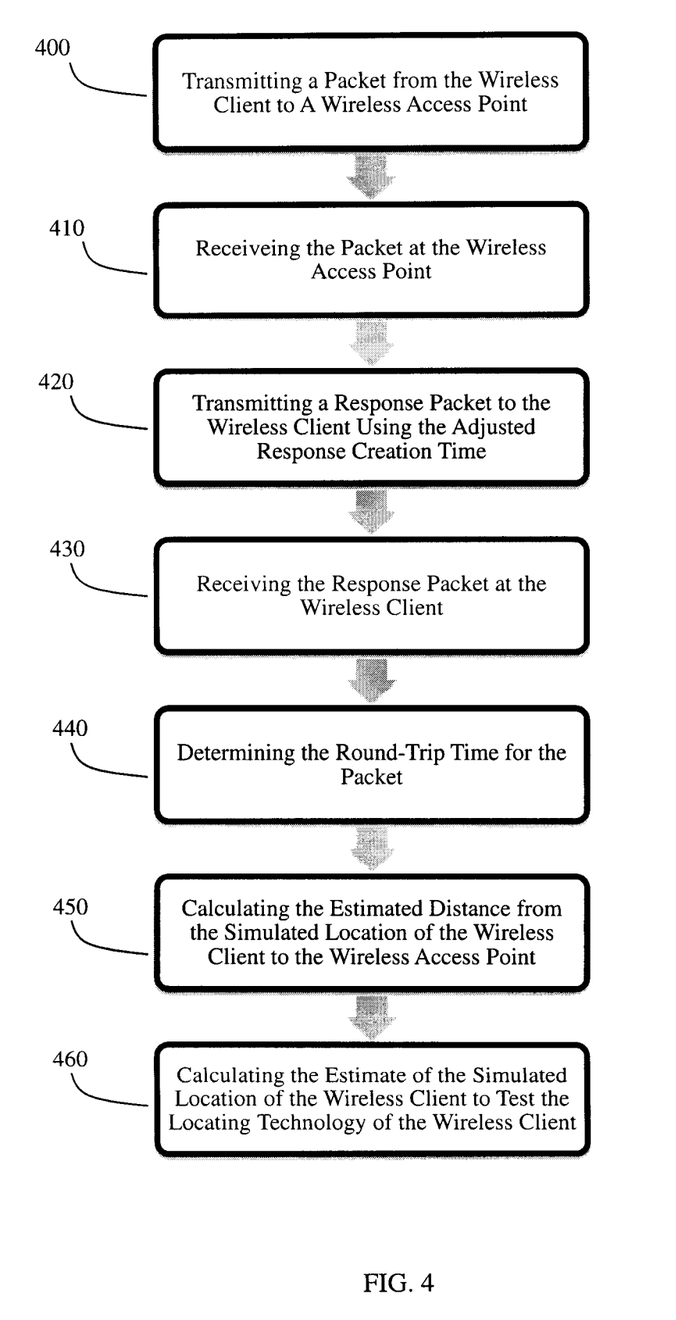
FIG. 4 is a flow diagram of a method for executing a position locating technology for a wireless client.

With reference to FIG. 4, in the execution of the test scenario, the wireless client under test does not know its simulated location, but is aware of the location of the wireless access points that are visible from its simulated location and the expected response creation time associated with each of the wireless access points. The objective of the test scenario is for the wireless client to determine an estimate of its simulated location knowing the locations of the wireless access points and the expected response creation time. The execution of the test may begin by operating the wireless access point to transmit beacon frames to announce the presence of the wireless access point to the wireless client. Upon detection of the beacon frame from the wireless access point, the test scenario may begin by transmitting a wireless packet from the wireless client to at least one of the wireless access points visible to the wireless client from the simulated location of the wireless client 400. The packet is received at the wireless access point 410 and the wireless access point transmits a response packet to the wireless client using the adjusted response creation time for the wireless access point. In other words, the wireless access point delays sending the response packet to the wireless client for a duration of time equal to the adjusted response creation time. The adjusted response creation time includes the simulated propagation delay of the wireless access point, which is proportional to the distance between the simulated location of the wireless client and the simulated location of the wireless access point, and the expected response creation time of the wireless access point. The wireless client then receives the response packet 430 and calculates a round-trip time for the packet 440. The round-trip time for the wireless client can be calculated by identifying a start time when the packet is sent from the wireless client and identifying a stop time when the response packet is received at the wireless client, and then determining the round-trip time as the difference between the start time and the stop time. From the round-trip time, the wireless client can calculate the estimated distance between its simulated location and the location of the wireless access point 450. The estimated distance from the simulated location of the wireless client to the location of the at least one wireless access point is calculated using the round-trip time for the packet and the expected response creation time for the wireless access point. The estimated distance from the simulated location of the wireless client to the location of the at least one wireless access point is equal to one half of the round-trip time minus the expected response creation time of the wireless access point. To the wireless client, the round-trip time is equal to the expected response creation time of the wireless access point and the propagation delay of the packet. However, the wireless access point transmitted the response packet using the adjusted response creation time which includes the expected response creation time of the wireless access point and the simulated propagation time representing the distance between the simulated location of the wireless client and the location of the wireless access point. As such, the wireless client interprets the increase in the round-trip time as due to the distance between the simulated location of the wireless client and the location of the wireless access point. As a result, a distance between the wireless client and the wireless access point is simulated by delaying the response packet transmitted by the wireless access point by a period of time equal to the simulated propagation delay, which represents the simulated distance between the wireless client and the wireless access point. The estimated distance between the simulated location of the wireless client and the location of the wireless access point and the location of the wireless access point from the wireless access point database can then be used to calculate an estimate of the simulated location of the wireless client 460, thereby testing the position locating technology of the wireless client.

In an additional embodiment, an array of multiple access points can be used by the wireless client to improve the accuracy of the simulated location estimate calculation of the wireless client. Accordingly, testing the wireless client may include simulating an array of access points that are visible to the wireless client from a simulated location. Using the array of access points, the test system may identify the distances between the simulated location of the wireless access point and the locations of each of the wireless access points in the array of wireless access points to calculate an adjusted response creation time for each of the wireless access points. The test scenario may then be run using the expected response creation and the adjusted response creation time for each of the wireless access points in the array of wireless access points. The wireless client may then use the round-trip time between each of the wireless access points to estimate its distance from each of the wireless access points and then use the estimated distances to estimate its simulated location to test the position locating technology of the wireless client.

The test scenario selected to perform the position locating testing on the wireless client may be selected from a database of test scenarios. Each of the test scenarios in the database includes a simulated location of the wireless client to be tested and the locations of the wireless access points that are visible to the wireless client from its simulated location. Additionally, the test scenario may include a simulated testing period. The simulated testing period specifies the period of time in which the test scenario is to be run. The simulated testing period may be specified using Coordinate Universal Time (UTC). The simulated location of the wireless client and the simulated testing period identify test scenario for the wireless client in both time and space. The simulated location of the wireless client and the simulated testing period are used to determine which wireless access points in the wireless access point database are visible to the wireless client during the specified simulated testing period.

The simulated location of the wireless client may change continuously during the simulated testing period, thereby simulating movement of the wireless client during the testing period. The elapsed time into the simulated testing period may be tracked, thereby allowing the determination of the simulated location of the wireless client at any point within the simulated testing period, as well as which wireless access points are visible to the wireless client and the locations of the visible wireless access points.

The quality and strength of the response signal generated by the wireless access points may be adjusted to emulate attenuating structures such as walls and buildings positioned between the simulated location of the wireless client and the simulated location of the wireless access points. The transmission power of the wireless access points may also be varied to emulate various transmit power settings for the wireless access point.

In a particular embodiment, the delay, quality and strength of the response signal generated by the wireless access points may be adjusted to emulate a multipath propagation environment. A multipath propagation may commonly occur when the wireless client is positioned in an indoor location where the transmission signals sent by the wireless client and the response signals generated by the wireless access points are reflected by objects located in the vicinity of the wireless client and the wireless access points. Incorporating a test scenario that emulates a multipath environment may enable the test system to create a more realistic test environment for the wireless client. The reflection of the signals resulting from the objects in the vicinity of the transmitters results in multiple delayed and attenuated copies of the transmitted signals. To simulate the effect of the wireless client positioned within an indoor environment, the wireless access points may emulate a multipath response by transmitting multiple delayed and attenuated copies of the transmitted signal according to a predefined multipath model defined in the test scenario. In this embodiment, the delay and attenuation of each of the individual multipath responses may be computed utilizing a statistical model of the multipath. Alternatively, the individual multipath responses may be modeled deterministically utilizing algorithms, such as optical ray tracing, employing the description of the walls of the indoor environment and their associated physical properties.

A test scenario database may be used to store the various test scenarios to be employed in the testing of the wireless client. The test scenario database may contain an entry for each individual test scenario, wherein each entry may include the location of the wireless client to be tested, a list of which wireless access points are visible to the wireless client, the period of time in which the test scenario will be run, the elapsed time into the testing period, the attenuation setting for each of the wireless access points and the transmit power setting for each of the wireless access points.

Additionally, the selection of the test scenario may be influenced by input from a Global Navigation Satellite System (GNSS) emulator connected to the wireless access point array emulator. In a particular embodiment, the GNSS emulator and the test scenario may be integrated to model the movement of the wireless client and to synchronize the timing of the movements. The integration of the GNSS emulator may enable the test scenario to test for hybrid location solutions which may combine both location measurements from the GNSS emulator and location estimates utilizing the wireless access point array emulator.

An access point database may be used to store the location of each wireless access point that is visible from the location of the wireless client identified in the selected test scenario and the expected response creation time for each of the wireless access points.

Figure 5:
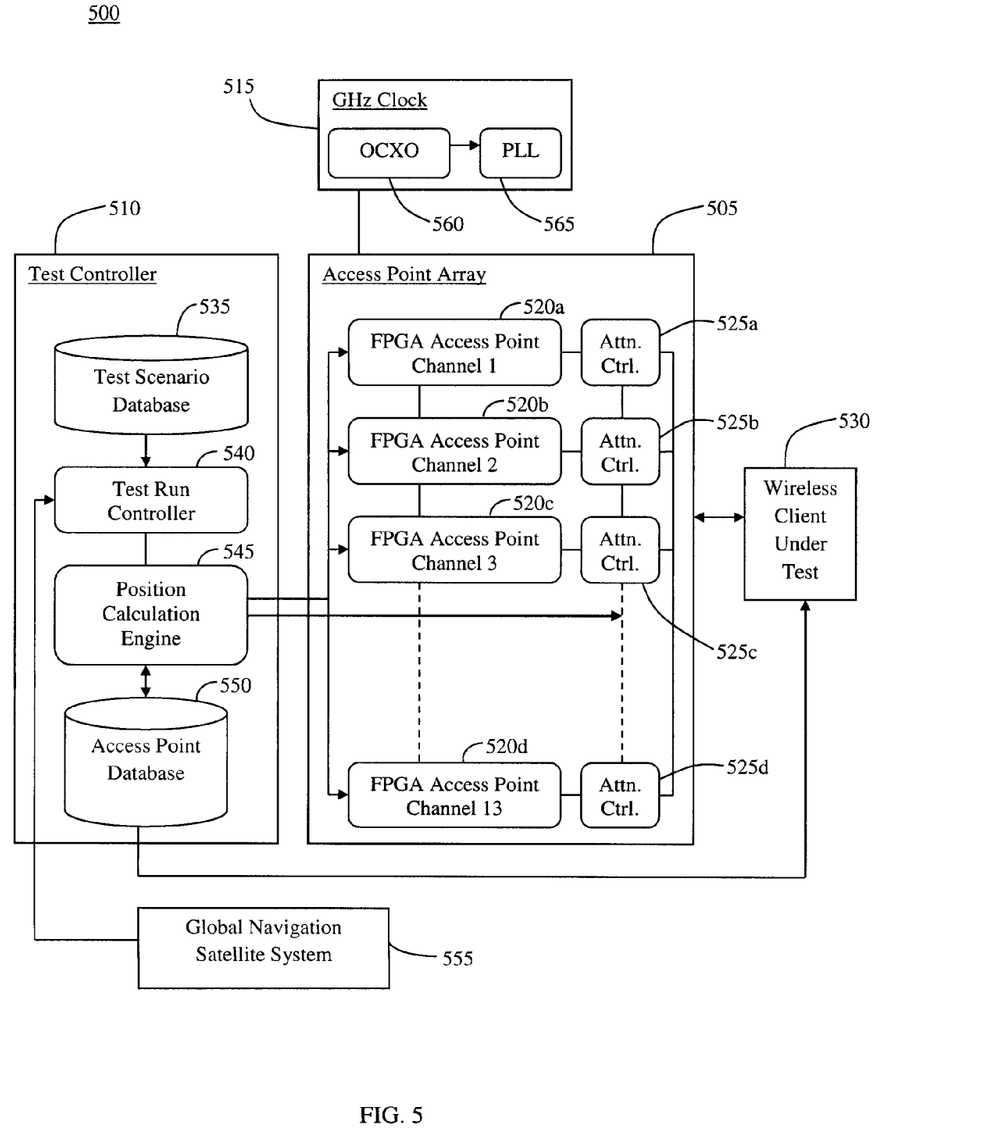
FIG. 5 is a diagram illustrating a system for testing a position locating technology for a wireless client.

With reference to FIG. 5, a system 500 for testing the wireless position locating technology of a wireless client under test 530 may include a test controller 510, a wireless access point array 505 and a high frequency clock 515.

The wireless client under test 530 may be a mobile phone, a personal computer having integrated WiFi position locating and navigation technology, or any other WiFi enabled device. It is desirable to be able to test the position locating and navigation technology of the wireless client 530 to ensure that the technology is capable of determining the location of the wireless client 530 quickly, accurately and under a wide variety of conditions.

The test controller 510 of the test system 500 may be implemented in a personal computer and may include a test scenario database 535, a test run controller 540, a position calculation engine 545 and an access point database 550. The test run controller 540 may be responsible for the selection of a test scenario from the test scenario database 535. The selection of the test scenario may additionally be influenced by input from a Global Navigation Satellite System (GNNS) 555. The test scenario that is selected to execute a test of the wireless client 530 may define a simulated location of the wireless client and the access points that are visible to the wireless client from the simulated location of the wireless client. Additionally, the test scenario may include a simulated testing period and a plurality of simulated locations of the wireless client 530, thus allowing for the simulation of movement of the wireless client 530 along a predetermined path. The test run controller 540 may track the elapsed time into the simulated testing period. By tracking the elapsed time into the simulated testing period, the test run controller 540 is aware of the absolute Coordinate Universal Time (UTC) realized by the wireless client under test 530 at any point in time during the duration of the simulated testing period.

The test run controller 540 may select a test scenario from the test scenario database 535 to control the access point array 505 to emulate a plurality of wireless access points 520a-520d for testing the wireless client 530. The test scenario database 535 may include an entry for each of a plurality of test scenarios that may be run on the wireless client under test 530. Each entry in the test scenario database 535 may contain an entry for each of a plurality of test scenarios defining which access points are visible to the wireless client 530 from a simulated location, the simulated testing period for the simulation and the simulated location of the wireless client 530 at any point in time during the simulated testing period. The wireless access points that are visible to the wireless client 530 may change during the simulated testing period as the simulated location of the wireless client 530 changes. Additionally, the test scenario database 535 may include an adjustable signal attenuation value for each of the wireless access points in the test scenario that defines the quality and strength of a signal transmitted from the wireless access point to emulate attenuating structures such as walls and buildings that may be positioned between the wireless access point and the simulated location of the wireless client. As such, the test run controller 540 selects a test scenario from the test scenario database 535 and then directs the access point array 505 to emulate the wireless access points that are visible to the wireless access point during the duration of the simulated testing period.

The position calculation engine 545 of the test controller 510 calculates an adjusted response creation time for each of the emulated wireless access points that are visible to the wireless client 530 during the duration of the simulated testing period. Although the emulated wireless access points 520a-520d are physically located at substantially the same location as the wireless client to be tested 530, in accordance with the selected test scenario it is necessary to simulate the locations of the wireless access points so that they appear to be at the locations specified in the selected test scenario. The adjusted response creation time calculated by the position calculation engine is used to simulate the locations of the wireless access points specified in the selected test scenario. Each of the wireless access points that are visible to the wireless access point in the test scenario has an associated expected response creation time. The expected response creation time represents the duration of time required for the wireless access point to generate a response to a signal received from a wireless client 530. In addition, the simulated propagation delay between the location of the wireless access point and the location of the wireless client specified in the test scenario can be calculated as the distance between the wireless access point and the wireless client, divided by the speed of light. The locations of the wireless client and the wireless access points are defined in the test scenario and as such, the simulated propagation delay can be calculated using these values. The position calculation engine 545 then calculates an adjusted response creation time for each of the emulated wireless access points visible to the wireless client as equal to the expected response creation time plus the simulated propagation delay. The position calculation engine 545 then transmits the calculated adjusted response creation time to each of the emulated wireless access points 520a-520d. Each of the emulated wireless access points then utilizes the adjusted response creation time instead of the expected response creation time to transmit a response signal to the wireless client under text 530. The additional delay added to the expected response creation time represents the simulated distance between the wireless client 530 and the wireless access point. The access point database 550 supplies the location of the wireless access points visible to the simulated location of the wireless client 530 and the expected creation time of the wireless access points to the wireless client 530 during the execution of the text scenario. When the wireless client 530 receives a response packet from the wireless access point 520a-520d, the wireless client interprets the increased response creation time as attributable to the propagation delay, which is proportional to the distance between the wireless access point and the wireless client.

The access point array 505 may include a plurality of wireless access points 520a-520d, each wireless access point 520a-520d to emulate a wireless radio or WiFi radio channel visible to a wireless client under test 530. The wireless access points 520a-520d could be emulated using a plurality of Field Programmable Gate Arrays (FPGA), one for each wireless radio channel. Alternatively, one FPGA could emulate more than one wireless channel. The access point array 505 may additionally include an attenuation controller 525a-525d for each of the wireless access points 520a-520d. The attenuation controller 525a-525d can dynamically adjust the quality and strength of the signal transmitted from the wireless access points 520a-520d to emulate attenuating structures. The wireless access points 520a-520d and the attenuation controllers 525a-525d receive control signals from the test controller 510 to direct the emulation of any physical arrangement of wireless access points and to simulated movement of the wireless client 530 to enable position locating and navigation testing of the wireless client 530.

Nanosecond timing accuracy is needed to introduce nanosecond delays in the response creation time of the wireless access points 520a-520d. Due to operating system limitations, the test controller 510 may be limited to microsecond timing levels and may be unable to produce a clock signal having nanosecond timing accuracy. A clock operating in the gigahertz range is needed to generate nanosecond timing accuracy for the test system 500. A gigahertz (GHz) clock 515 may be provided using an oven controlled crystal oscillator (OCXO) 560 together with a phase-locked-loop (PLL) circuit 565 to establish a nanosecond clock signal for the test system 500. The GHz clock 515 provides a control signal to the access point array 505 to establish nanosecond delays in the response creation time of the wireless access points 520a-520d.

In an exemplary embodiment of the operation of the test system 500, the test run controller 510 selects a test scenario from the test scenario database 535 which identifies a simulated location of the wireless client under test 530 and the locations of the wireless access points visible to the wireless client from the simulated location. The test run controller 510 may additionally identify an attenuation signal setting for each of the wireless access points visible to the wireless client. The position calculation engine 545 then calculates an adjusted response creation time for each of the wireless access points visible to the wireless client based on the distances between the simulated location of the wireless client and the locations of the wireless access points visible to the wireless client. The position calculation engine 545 communicates the adjusted response creation time for each of the wireless access points to each of the wireless access points 520a-520d in the access point array 505 and the test controller sets the attenuation of the attenuation controllers 525a-525d based on the attenuation signal setting for each of the wireless access points. The GHz clock 515 is coupled to the access point array 505 to enable the nanosecond delays required by the adjusted response creation time for the wireless access points 520a-520d. The wireless client under test 530 then sends a signal to one or more of the wireless access points 520a-520d and retrieves the location information and expected response creation time for each of the wireless access points 520a-520d from the access point database 550. The wireless access points 520a-520d respond by sending a response packet to the wireless client 530 based on the adjusted response creation time for the wireless client. The wireless client 530 receives the response packet and identifies the round-trip time for the packet. Knowing the location of the wireless access points and the expected response creation time of the wireless access points from the access point database 550, the wireless client 530 then calculates the estimated distance to each of the wireless access points based on the round-trip time for the packet and the adjusted response creation time. The wireless client 530 interprets the increased round-trip time for the packet, introduced by the adjusted response creation time for the wireless access point, as the distance between the wireless client and the wireless access point. The wireless client 530 then uses the estimated distances from the wireless access points to calculate an estimate of its simulated location specified in the selected test scenario, thereby testing the position locating technology of the wireless client under test 530.

Emulating an array of wireless access points in a variety of chosen physical arrangements through software and hardware provides for robust testing of the position locating technology of a wireless client. Utilizing an emulator to test the position locating technology has many advantages over previous methods which may include physically setting up an array of wireless access points. With an emulator, the device under test is connected to the emulator with a radio frequency cable. As such, there is no interference from wireless access points that are operating in the vicinity of the emulator that are not part of the array of access points being emulated. The use of an emulator also allows for dynamic testing of the wireless client, wherein the test signals can be dynamically altered to give the device under test the impression that it is moving on a pre-computed path. With the emulator and controller, the simulated locations of the wireless access points comprising the wireless access point array are modeled in software and as such, the simulated locations can be changed substantially instantaneously between test runs. The emulator provides repeatability by allowing an identical test to be run consecutively under identical circumstances. Additionally, the emulator can be run in tandem with a satellite constellation emulator, thereby allowing the cooperation of a combined Global Navigation Satellite System (GNSS) and wireless location system to be tested.

The foregoing descriptions of specific embodiments of have been presented for purposes of illustration and description. They are not intended to be exhaustive or to limit the invention to the precise forms disclosed, and obviously many modifications and variations are possible in light of the above teaching. The embodiments were chosen and described in order to best explain the principles and practical applications, to thereby enable others skilled in the art to best utilize the various embodiments with various modifications as are suited to the particular use contemplated. It is intended that the scope be defined by the claims appended hereto and their equivalents.

The invention claimed is:

1. A method for testing a position locating technology of a wireless client, the method comprising:
   selecting a test scenario for the wireless client, the test scenario comprising at least one simulated location of the wireless client and at least one wireless access point visible to the wireless client from the simulated location of the wireless client;
   identifying an expected response creation time for the at least one wireless access point visible to the wireless client;
   emulating the at least one wireless access point visible to the wireless client;
   simulating a distance between the simulated location of the wireless client and a location of the at least one wireless access point using an adjusted response creation time for the at least one wireless access point; and
   executing the test scenario using the expected response creation time and the adjusted response creation time for the at least one wireless access point to test the position locating technology of the wireless device.

2. The method of claim 1, wherein the adjusted response creation time is generated by:
   identifying a distance between the simulated location of the wireless client and the location of the at least one wireless access point;
   calculating a simulated propagation delay for a packet to be transmitted between the wireless client and the at least one wireless access point, the simulated propagation delay to equal the simulated distance between the simulated location of the wireless client and the location of the at least one wireless access point, divided by the speed of light; and
   calculating the adjusted response creation time as equal to the sum of the expected response creation time and the simulated propagation delay.

3. The method of claim 1, wherein executing the test scenario for the wireless client further comprises:
   transmitting a packet from the wireless client to the at least one wireless access point;
   receiving the packet at the at least one wireless access point;
   transmitting a response packet from the at least one wireless access point to the wireless client using the adjusted response creation time by delaying the transmission of the response packet for a time equal to the adjusted response creation time;
   receiving the response packet at the wireless client;
   determining a round-trip time for the packet;
   calculating an estimated distance from the simulated location of the wireless client to the location of the at least one wireless access point using the round-trip time for the packet and the expected response creation time, wherein the estimated distance is equal to one half of the round-trip time minus the expected response creation time, multiplied by the speed of light; and
   calculating an estimate of the simulated location of the wireless client using the estimated distance from the simulated location of the wireless client to the location of the at least one wireless access point.

4. The method of claim 3, wherein determining the round-trip time for the packet further comprises:
   identifying a start time when the packet is sent from the wireless client;
   identifying a stop time when the response packet is received at the wireless client; and
   subtracting the start time from the stop time.

5. The method of claim 1, wherein the test scenario further comprises a simulated testing period and a plurality of simulated locations of the wireless client, the simulated location of the wireless client being adjusted to each of the plurality of simulated locations during the simulated testing period.

6. The method of claim 1, wherein the test scenario further comprises an adjustable signal attenuation setting for the at least one wireless access point.

7. The method of claim 1, wherein the test scenario further comprises an adjustable transmit power setting for the at least one wireless access point.

8. The method of claim 1, wherein the at least one wireless access point comprises an array of wireless access points.

9. The method of claim 1, wherein identifying the expected response creation time further comprises:
   receiving the expected response creation time from a wireless access point database.

10. The method of claim 1, wherein identifying the expected response creation time further comprises:
    receiving the expected response creation time from the at least one wireless access point.

11. The method of claim 1, wherein selecting the test scenario for the wireless client further comprises:
    receiving input from a Global Navigation Satellite System (GNSS) emulator.

12. The method of claim 1, wherein the test scenario further comprises a simulated testing period, and wherein selecting the test scenario for the wireless client further comprises identifying an elapsed time of the simulated testing period.

13. The method of claim 1, wherein the test scenario further comprises a simulated multipath environment, and wherein the test scenario further comprises a plurality of adjusted response creation times to simulate the simulated multipath environment.

14. A test system for testing a position locating technology of a wireless client, the test system comprising:
    a high frequency clock;
    a test run controller;
    at least one wireless access point to receive a control input from the test run controller and a clock input from the high frequency clock, wherein the test system is to simulate a distance between a simulated location of the wireless client and a location of the at least one wireless access point using an adjusted response creation time for the at least one wireless access point; and
    an access point database to provide an expected response creation time and the location of the at least one wireless access point.

15. The test system of claim 14, wherein the at least one wireless access point comprises an array of wireless access points.

16. The test system of claim 14, further comprising:
    a test scenario database comprising a plurality of test scenarios, wherein each test scenario includes at least one simulated location of the wireless client and the location of the at least one wireless access point visible to the wireless client; and
    a position calculation engine to calculate the adjusted response creation time for the at least one wireless access point, wherein the test run controller is to select one or more of the plurality of test scenarios from the test scenario database.

17. The test system of claim 16, wherein each test scenario includes a simulated testing period and a plurality of simulated locations for the wireless client, the simulated location of the wireless client being adjusted to each of the plurality of simulated locations during the simulated testing period.

18. The test system of claim 16, further comprising an attenuation controller coupled to an output of the at least one wireless access point and to the test scenario database, wherein the test scenario database provides an adjustable signal attenuation setting for the at least one wireless access point.

19. The test system of claim 16, wherein the test run controller is to receive inputs from a Global Navigation Satellite System (GNSS) emulator.

* * * * *